3,368,955
RADIOCHEMICAL SYNTHESIS OF CYCLO-ALKANOLS AND CYCLOALKANONES
Alfred J. Restaino, Trenton, N.J., and Robert F. Hornbeck, Livermore, Calif., assignors to Atlas Chemical Industries, Inc., Wilmington, Del., a corporation of Delaware
No Drawing. Filed Sept. 18, 1962, Ser. No. 224,521
3 Claims. (Cl. 204—162)

This invention relates to a process for preparing cycloalkanols and cycloalkanones and in particular to a process for subjecting a mixture comprising cyclohexane, nitric oxide and chlorine to high energy, ionizing radiation to produce cyclohexanol and cyclohexanone.

It has been reported by Harold A. Dewhurst in the Journal of Physical Chemistry, volume 63, pp. 813–816 (1959) that cyclohexanol and cyclohexanone are produced when cyclohexane is irradiated with an 800 k.v.p. electron beam in the presence of pure oxygen. The G-values (molecules of product per 100 electron volts), which are reported to be independent of oxygen concentration over the range of one to ten atmospheres of oxygen pressure, for this radiochemical process were found to be:

$$G(cyclohexanol) = 3.7$$
$$G(cyclohexanone) = 3.5$$

In addition, German Patent 958,840 issued to Eugen Müller, Horst Metzger and Dorla Fries on Feb. 28, 1957 discloses a process for subjecting cycloaliphatic hydrocarbons in the presence of nitric oxide and chlorine to irradiation with ultra violet light. When cyclohexane was used as the cycloaliphatic reactant, the patentees disclose that the principal products were 1-chloro-1-nitrosocyclohexane and bis nitrosocyclohexane. There is no disclosure that cyclohexanol and/or cyclohexanone were produced.

It is an object of this invention to provide a radiochemical process for producing cycloalkanols and cycloalkanones.

Another object of the invention is to provide a process for producing cyclohexanol and cyclohexanone wherein cyclohexane is subjected to high energy, ionizing radiation in the presence of nitric oxide and chlorine.

A further object is to provide a radiochemical process for the production of cycloalkanols and cycloalkanones which has a more efficient utilization of the radiant energy than currently used procedures.

Other objects and purposes of this invention will be apparent to those skilled in the art in view of the description which follows.

It has been discovered that cycloalkanols and cycloalkanones can be produced by subjecting cycloalkanes in the presence of nitric oxide and chlorine to high energy, ionizing radiation. In general, it has been found that substantially greater amounts of cycloalkanol are produced than cycloalkanone when chlorine gas is used as the catalyst, but the use of other catalysts, such as stannous chloride, may promote the production of an increased proportion of cycloalkanone. If desired, a mixture of catalysts might be used.

In accordance with this invention, the cycloalkanes which may be oxidized to their corresponding alcohols and ketones are those unsubstituted cycloalkanes having from five to seven carbon atoms per molecule such as cyclopentane, cyclohexane and cycloheptane. Cyclohexane is a particularly preferred cycloalkane reactant.

One of the advantages of the radiochemical process of this invention is that it can be performed at ambient temperatures and pressures. Of course if desired, one may vary the temperature and pressure of the reaction which will tend to vary the nature and proportion of the products which are produced.

The high energy, ionizing radiation employed in the radiochemical process of this invention may be either electromagnetic or particulate in nature and should have an energy of at least 100 electron volts, preferably at least 10,000 electron volts. Examples of such high energy, ionizing radiations are fission fragments, accelerated electrons, beta-particles, alpha-particles, protons, neutrons and deuterons and electromagnetic radiations such as X-rays and gamma rays.

A wide range of radiation dosages may be employed in carrying out the radiochemical process of this invention, the principal determinant being that the radiation dosage should be sufficient to produce the desired result to an economically useful degree.

In general, the radiation dosages employed may range from about $5 \times 10^4$ rads to about $20 \times 10^6$ rads. A rad is a standard radiation dosage unit equivalent to an absorption of 100 ergs per gram of material being irradiated. It is particularly preferred that the radiation dosage range from about $10 \times 10^4$ rads to about $5 \times 10^6$ rads.

The radiochemical process of this invention is preferably carried out by exposing a liquid cycloalkane containing nitric oxide and chlorine to the high energy, ionizing radiations to produce cycloalkanol and cycloalkanone. In the preferred method, the cycloalkane is flushed with nitrogen gas to purge it of air, and thereafter, the nitric oxide and chlorine gases are bubbled through the cycloalkane which is simultaneously being irradiated.

Another advantage of this radiochemical process, other than the usual advantages inherent in radiochemical processes, is that it provides more efficient utilization of the radiant energy than currently used radiochemical processes for producing cycloalkanols and cycloalkanones. As previously stated, Dewhurst reports that the irradiation of cyclohexane in the presence of pure oxygen produces cyclohexanol and cyclohexanone having G-values of 3.7 and 3.5 respectively. As will be noted in the examples the radiochemical process of this invention in the absence of a catalyst produces cyclohexanol and cyclohexanone having G-values of 20 and 5 respectively.

Cycloalkanols and cycloalkanones are useful and important commercial products. Cyclohexanol is used extensively in the rubber and textile industries, and cyclohexanone is a useful solvent and is used in the production of adipic acid which is utilized in the synthesis of nylon.

The following example illustrates a radiochemical process in accordance with this invention:

EXAMPLE

Cyclohexane was charged to a glass vessel equipped with a gas dispersion tube. The cyclohexane was flushed with nitrogen gas until it was purged of air. A mixture of nitric oxide (9 parts by volume) and chlorine (1 part by volume) was passed through the liquid cyclohexane at a rate of 5.5 liters per hour while the cyclohexane was being irradiated with fission product gamma rays. The irradiation was carried out at a rate of 56,000 rads per hour for 3.75 hours, delivering a total dosage of 210,000 rads. After completion of the irradiation, the system was again purged with nitrogen.

Gas-liquid partition chromatographic analysis of the reaction mass disclosed the following products and yields:

| Product: | G-value |
|---|---|
| Cyclohexyl chloride | 64 |
| Cyclohexanol | 20 |
| Cyclohexanone | 5 |

Having completely described this invention, what is claimed is:

1. A radiochemical process for preparing cycloalkanols and cycloalkanones which comprises subjecting an unsubstituted cycloalkane having from 5 to 7 carbon atoms per molecule, nitric oxide and chlorine to high energy, ionizing radiation sufficient to deliver a total radiation dosage ranging from about $5 \times 10^4$ rads to about $20 \times 10^6$ rads.

2. A radiochemical process for preparing cyclohexanol and cyclohexanone which comprises subjecting cyclohexane, nitric oxide and chlorine to high energy, ionizing radiation sufficient to deliver a total radiation dosage ranging from about $5 \times 10^4$ rads to about $20 \times 10^6$ rads.

3. A process in accordance with claim 2 in which the radiation dosage ranges from about $10 \times 10^4$ rads to about $5 \times 10^6$ rads.

References Cited

UNITED STATES PATENTS

| | | | |
|---|---|---|---|
| 2,985,572 | 5/1961 | Von Schikh et al. | 204—162 |
| 3,062,812 | 11/1962 | Taylor | 204—162 |
| 3,050,452 | 8/1962 | Louthan | 204—162 |

OTHER REFERENCES

Bovey, Effects of Ionizing Radiation on Natural and Synthetic High Polymers (1958) pp. 2 and 33.

HOWARD S. WILLIAMS, *Primary Examiner.*

JOHN H. MACK, *Examiner.*